(12) United States Patent  
Yang

(10) Patent No.: US 9,097,274 B1  
(45) Date of Patent: Aug. 4, 2015

(54) SCREWS WITH FUNCTION OF SCREWDRIVER

(71) Applicant: Chi Tien Lin, Taichung (TW)

(72) Inventor: Ya Yun Yang, Taichung (TW)

(73) Assignee: Chi Tien Lin, Taichung (TW)

( * ) Notice: Subject to any disclaimer, the term of this patent is extended or adjusted under 35 U.S.C. 154(b) by 11 days.

(21) Appl. No.: 14/202,920

(22) Filed: Mar. 10, 2014

(51) Int. Cl.
*F16B 23/00* (2006.01)
*F16B 35/06* (2006.01)

(52) U.S. Cl.
CPC *F16B 35/06* (2013.01); *F16B 23/00* (2013.01)

(58) Field of Classification Search
CPC .................................. F16B 35/06; F16B 23/00
USPC .......................................... 411/403, 406, 407
See application file for complete search history.

(56) References Cited

U.S. PATENT DOCUMENTS

| | | | | | |
|---|---|---|---|---|---|
| 747,854 | A | * | 12/1903 | Clark | 403/316 |
| 1,541,518 | A | * | 6/1925 | McCain | 411/409 |
| 2,677,985 | A | * | 5/1954 | Vaughn | 411/406 |
| 2,954,719 | A | * | 10/1960 | Vaughn | 411/406 |
| 3,078,754 | A | * | 2/1963 | De Lacy | 411/403 |
| 3,540,342 | A | * | 11/1970 | Vaughn | 411/407 |
| 4,033,003 | A | * | 7/1977 | Marroquin | 470/8 |
| 4,685,848 | A | * | 8/1987 | Langer | 411/402 |
| 5,017,068 | A | * | 5/1991 | Cooksey | 411/373 |
| 5,207,545 | A | * | 5/1993 | Kochanski | 411/383 |
| 5,415,507 | A | * | 5/1995 | Janusz et al. | 411/5 |
| 2005/0257356 | A1 | * | 11/2005 | Van De Loo et al. | 29/238 |
| 2006/0210355 | A1 | * | 9/2006 | Stauss | 403/258 |

* cited by examiner

Primary Examiner — Gary Estremsky

(57) ABSTRACT

A set of screws with function of screwdriver each comprises a circular head with a torque slot across the top thereof. The torque slot has two opposite semi-moon shaped sides, a curved bottom, and a width about the same as the height of the circular head. One of the screws acts as the fastener, and another one of the screws acts as the screwdriver by that the circular head of the screwdriver is inserted to the torque slot, and the screw body thereof is perpendicular to the fastener to form an arm for being exerted a force to the fastener.

2 Claims, 5 Drawing Sheets

SCREWS WITH FUNCTION OF SCREWDRIVER

BACKGROUND OF THE INVENTION

1. Field of the Invention

The present invention relates to screws with function of screwdriver, and more particularly to screws capable of acting as either fasteners or screwdriver.

2. Description of Related Art

It is known that the screws are widely applied in the hardware, machinery, furniture, appliances and etc. to fasten assembled parts. In order to allow the screws to perform fastening jobs, a screwdriver is essential; due to many types and sizes of the screws, it is necessary to prepare many screwdrivers in different specifications and sizes for the corresponding screws. In fact, the screws currently have several tens types and sizes available on the market, and it is hard to offer the screwdrivers corresponding to the screws completely. Especially, many products use screws with unique specification, and it is very difficult for the consumers to find a right screwdriver. Therefore, there are following puzzles the consumers usually meet:

1. The screwdrivers are too large or too long to be used.
2. The screwdrivers are too small or too short to apply a force.
3. Although the size of certain screwdriver matches a specific screw, the screwdriver slot provided on the screw cracks at the time of the screwdriver being exerted a force to the screw, and it results in the screwdriver slipping off; under the circumferences, the screw is jammed there and unable to move forward or backward such that it leads to the fastened parts being either insufficiently fastened or not detachable.
4. Due to restriction of space available for the assembled product, the axial line of the screwdriver is often unable to coincide with the axial line of the screw even if the tip end of the screwdriver has inserted in the screwdriver slot of the screw; as a result, it may derive problems such as the assembled parts being not tightened or detached properly.

SUMMARY OF THE INVENTION

In order to overcome the preceding deficiencies, the main objective of the present invention is to provide screws with function of screwdriver, i.e., the screws can act as screwdrivers in addition to being fasteners themselves. While the screws act as screwdrivers, the body of the respective screw becomes an arm of a moment to exert a force easily to the screw being engaged to the fastened parts. Further, it is advantageous that the screws act as screwdrivers are not affected by the restriction of space. Further, the head of the respective screw is provided with anti-slip embossing at the circumferential side thereof, and it is convenient for the screws to be held and turned to help the fasten job or to loosen the parts with fingers easily.

To achieve the preceding object, the respective screw with function of screwdriver comprises a torque slot across the circumference of the head of the screw with two opposite semi-moon shaped sides and a curved bottom; the width of the torque slot is about the same as the height of the head of the screw; the head of the screw, which acts as the screwdriver, is inserted to the torque slot of the screw acting as a fastener with the head thereof and the body thereof becoming the arm for being exerted with a force to the screw acting as the fastener easily.

BRIEF DESCRIPTION OF THE DRAWINGS

Further benefits and advantages of the present invention will become apparent after a careful reading of the detailed description with appropriate reference to the accompanying drawings.

DETAILED DESCRIPTION OF THE INVENTION

Figure 1:
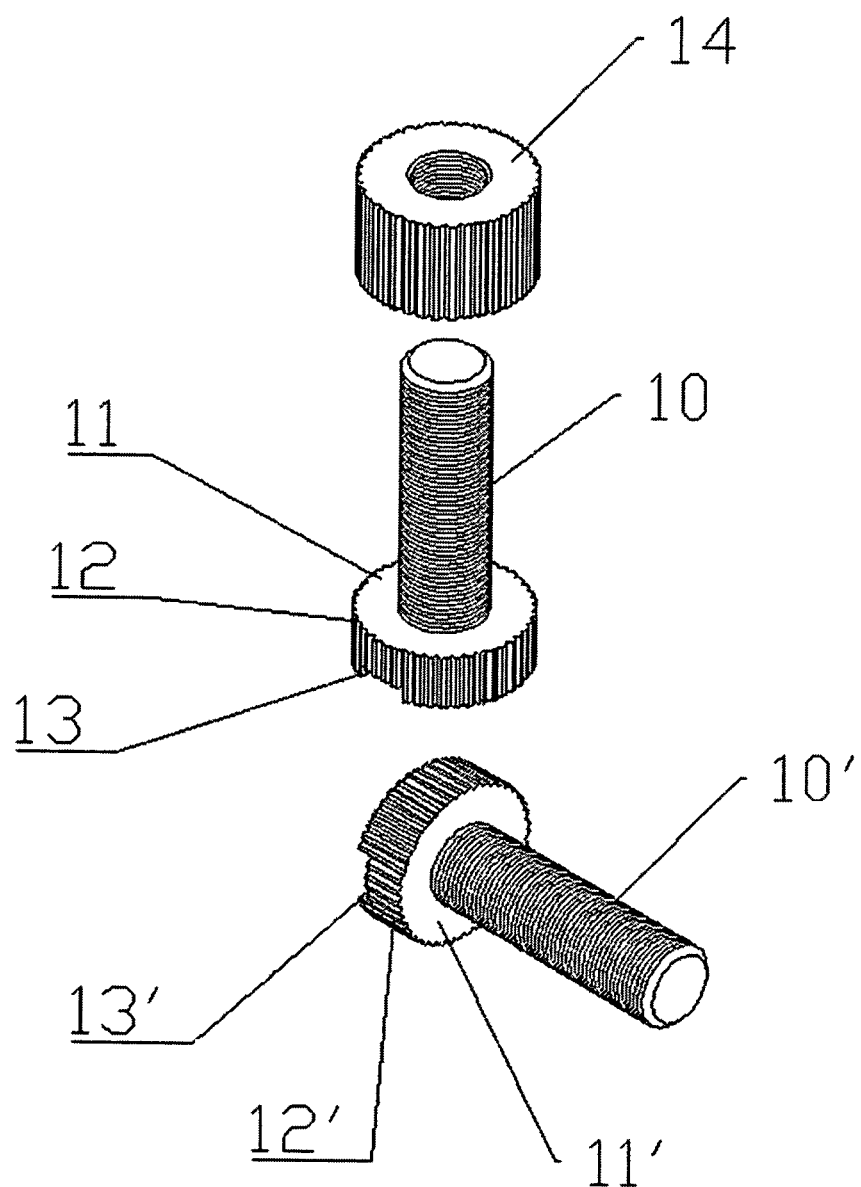
FIG. 1 is an exploded perspective view illustrating a preferred embodiment of screw with function of screwdriver according to the present invention.
Figure 2:
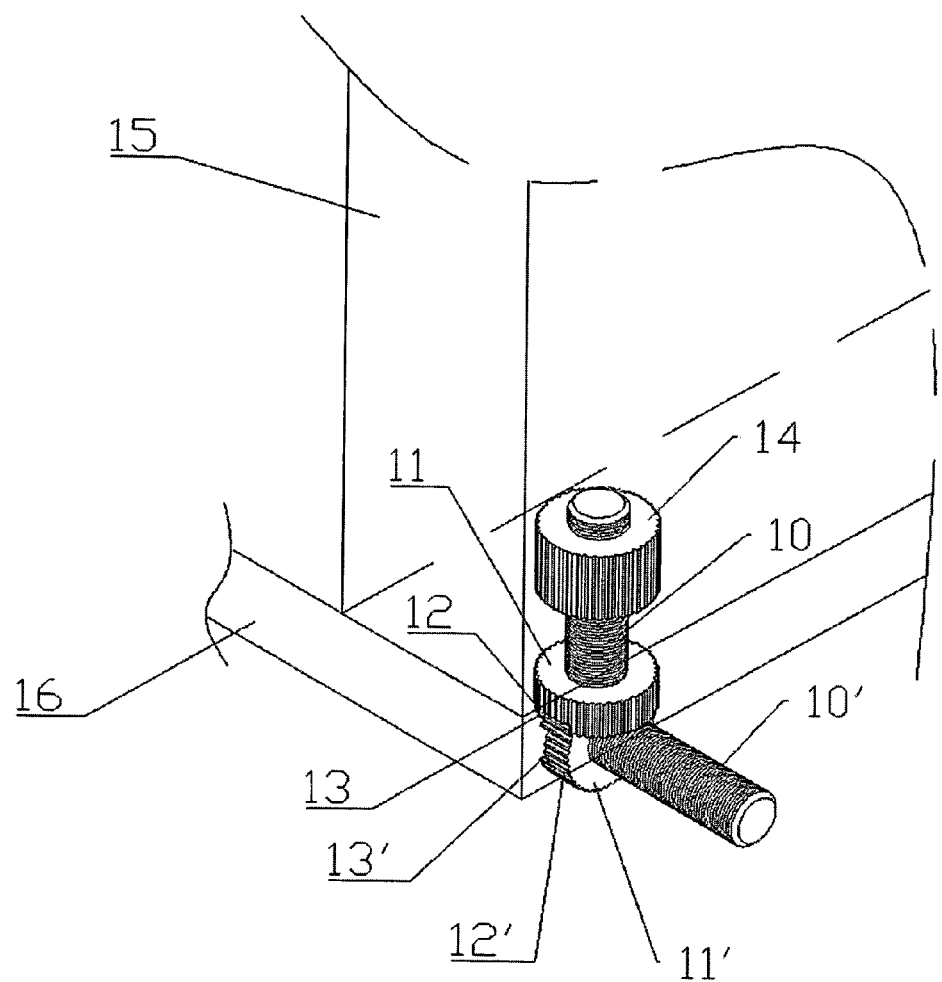
FIG. 2 is a perspective view illustrating an exemplary example to implement the embodiment shown in FIG. 1.
Figure 3:
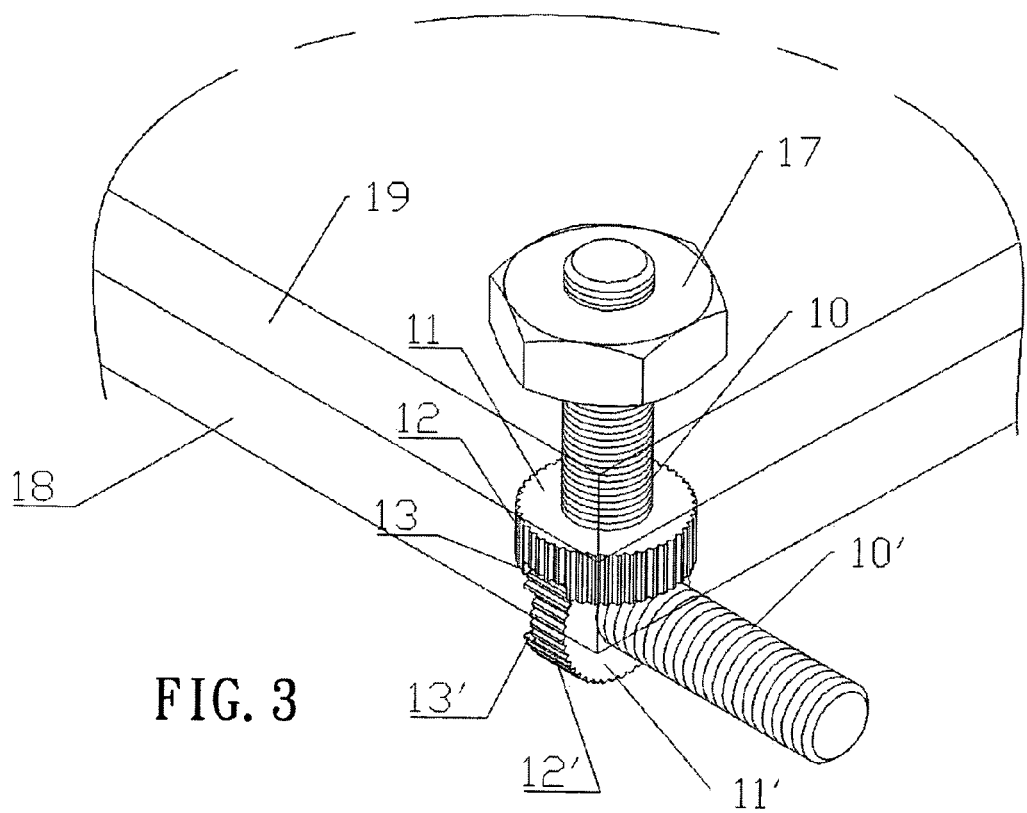
FIG. 3 is a perspective view illustrating another exemplary example to implement the embodiment shown in FIG. 1.

Referring to FIGS. 1 and 3, a preferred embodiment of screw with function of screwdriver in accordance with the present invention and exemplary examples thereof are illustrated. Basically, a screw 10, which works as a fastener, is employed to fasten board parts 15 and 16 together as shown in FIG. 2 or fasten parts 18 and 19 together as shown in FIG. 3; another screw 10', which works as a screwdriver, is employed to turn the screw 10 to engage with a round nut to perform fastening job as shown in FIG. 2 or to engage with a hexagon nut to perform fastening job as shown in FIG. 3. The respective screw 10, 10' has a circular head 11, 11' with a torque slot 13, 13' at the top of the head 11, 11'. The respective torque slot 13, 13' extends across the circumference of the circular head 11, 11' with two opposite half-moon shaped sides and a curve bottom (see FIG. 4) with the width of the respective torque slot 13, 13' slightly greater than the height of the respective head 11, 11'. The structure of the head 11, 11' with the half-moon shaped sides and curve bottom allows the screw 10' to work as a screwdriver as shown in FIGS. 2 and 3, the circular head 11' of the screw 10' fits with the torque slot 13 of the screw 10, and the screw body of the screw 11' is extends to be perpendicular to the screw 10 and act as an arm of a moment for being exerted a force; because the torque slot 13 formed with the half-moon shaped sides and the curve bottom has a depth greater than the slot head or cross-recess head of the traditional screw such that the slot or cross-recess cracks resulting from excess force applied to the screw can be avoided, the width of the torque slot 13 snugly fitting with the head 11' is capable of preventing the head 11' from slipping off at the time of the force being exerted, and the screws 10, 10' are perpendicularly disposed with each other instead of the traditional screwdriver being disposed at the same axial line with the screw such that the screw 10' works as a screwdriver for the screw 10 to engage with the nut 14, 17 more easily and effectively.

Referring to FIGS. 2 and 3 again, the circumferential sides of the circular head 11, 11' are provided with anti-slip embossing 12, 12'; therefore, the circular head 11' can be held and turned by fingers to help the screw 10 to fasten the board parts 15, 16 with the nut 14 or board parts 18, 19 with the nut 17 steadily.

Figure 4:
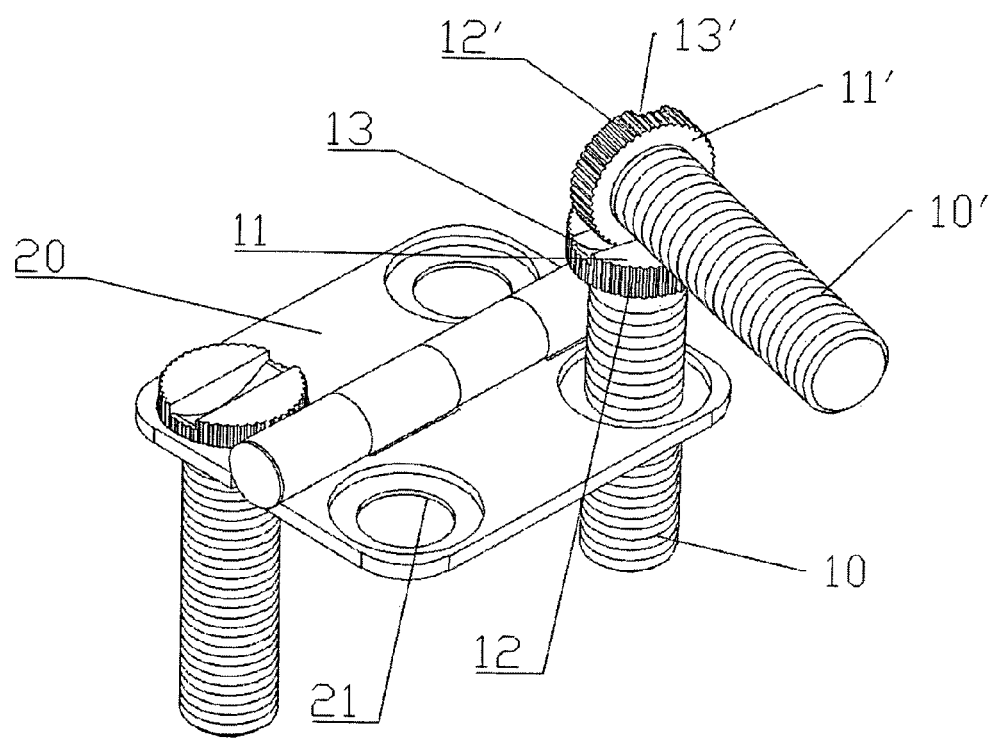
FIG. 4 is a perspective view illustrating a further exemplary example to implement the embodiment shown in FIG. 1.

Referring to FIG. 4, an exemplary example of using the screw with function of screwdriver to fasten a hinge is illustrated. The hinge 20 has through holes 21 and each of the through holes 21 is inserted with a screw 10 respectively. A screw 10' has the head 11' thereof being inserted to the torque slot 13 to act as a screwdriver to turn the respective screw 10 such that the hinge can be fastened securely. It is noted that the hinge 20 shown in FIG. 4 is only an example, and other type hinges can be fastened with the screws 10, 10' as well.

Figure 5:
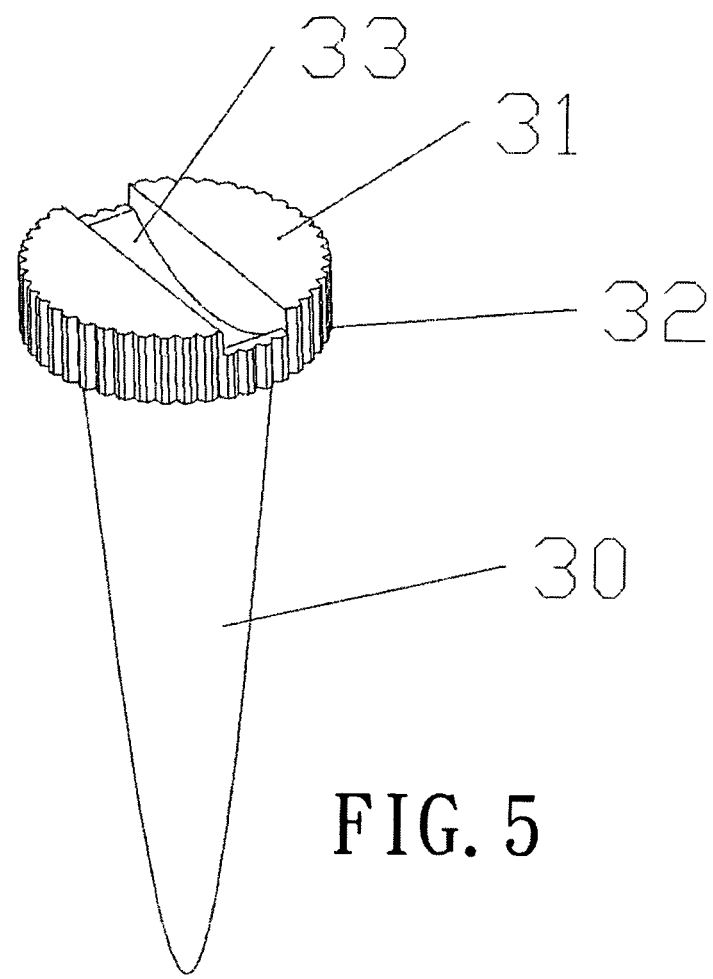
FIG. 5 is an exploded perspective view illustrating another preferred embodiment of screw with function of screwdriver according to the present invention.

Referring to FIG. 5, another embodiment of screws with function of screwdriver in accordance with the present invention is illustrated. A screw 30, which is capable of acting as a screwdriver, is different from the screws 10, 10' of the preceding embodiment in that the screw 30 is a taper shape with a tip such that the screw body of the screw 30 can embed in the fastened parts instead of engaging with a nut shown in FIGS. 2 and 3. The circular head 31 of the screw 30 has a torque slot 33 at the top thereof with anti-slip embossing 32 provided at the circumferential side thereof as well. Therefore, the torque slot 33 can be inserted with the circular head 31 of another screw which works as a screwdriver, and the anti-slip embossing 32 can be held to assist the fastening job.

It is appreciated from the above description with regard to the screw with function of screwdriver of the present invention, the feature of the present invention is in that the head of the screw provides a torque slot with two opposite semi-moon shaped sides and a curve bottom.

Although the invention has been explained in relation to its preferred embodiments, it is to be understood that other possible modifications and variations can be made without departing from the spirit and scope of the invention as hereinafter claimed.

What is claimed is:

1. A set of screws with function of screwdriver comprising:
at least a first screw acting as a fastener;
at least a second screw being identical with the first screw in structure and acting as a screwdriver;
wherein the respective screw has a circular head and a screw body; the circular head has a height, a top and a torque slot across the top; the torque slot has two opposite semi-moon shaped sides, a curved bottom, and a width about the same as the height of the circular head; the circular head of the second screw is inserted to the torque slot of the first screw snugly with the screw body of the second screw being perpendicular to the first screw to act as an arm to be exerted with a force to the first screw.

2. The screw with function of screwdriver as defined in claim 1, wherein the circumference of the circular head is provided with anti-slip embossing.

\* \* \* \* \*